United States Patent [19]
Nagao

[11] 4,294,509
[45] Oct. 13, 1981

[54] OPTICAL CIRCULATORS

[76] Inventor: Tsukasa Nagao, 4-75, Mabori, Yokosuka-shi, Kanagawa-ken, Japan

[21] Appl. No.: 100,893

[22] Filed: Dec. 6, 1979

[30] Foreign Application Priority Data

Dec. 8, 1978 [JP] Japan ................ 53-152308

[51] Int. Cl.³ .................... G02F 1/00; G02B 5/30
[52] U.S. Cl. .................. 350/96.15; 350/96.13; 350/370; 350/394; 350/400
[58] Field of Search ........... 350/96.13, 96.15, 151, 350/370, 394, 400

[56] References Cited
U.S. PATENT DOCUMENTS

| | | | |
|---|---|---|---|
| 4,143,939 | 3/1979 | Desormiere et al. | 350/96.13 |
| 4,153,328 | 5/1979 | Wang | 350/96.13 |
| 4,168,107 | 9/1979 | Sauter | 350/96.13 |
| 4,221,460 | 9/1980 | Hepner et al. | 350/96.13 |

*Primary Examiner*—Stewart J. Levy
*Attorney, Agent, or Firm*—Spensley, Horn, Jubas & Lubitz

[57] ABSTRACT

An optical circulator in which a cubic prism for a signal coupler, a lens-like magneto-optic structure, and a reflecting structure are utilized as important constituents acts a role of circulation in optical region. Basic features of the optical circulator are such that a signal light cumulatively effects the Faraday rotation on repeated passages through the magneto-optic structure and therefore a shortened magneto-optic structure will provide sufficient roles in performing a circulator action, and furthermore, such multiple passage of the signal light will introduce useful resonant modes in the magneto-optic structure in order to produce operating modes which can achieve various multiple circulation frequency operations in the optical region. And also the optical circulator has low loss characteristics and broad availability especially in the field of optical communication.

27 Claims, 22 Drawing Figures

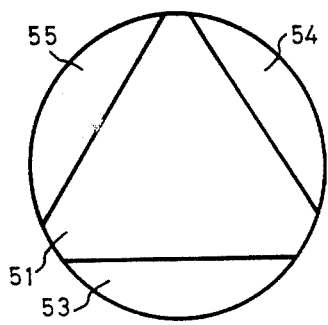
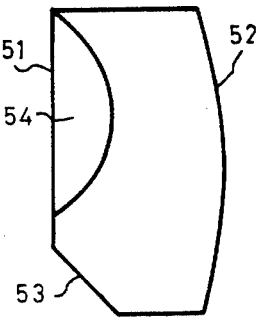
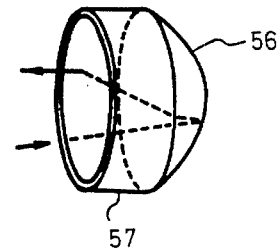
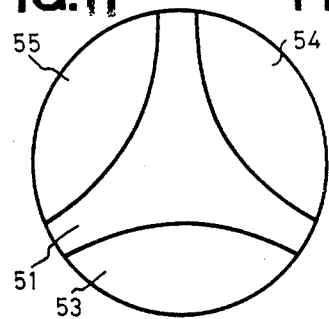
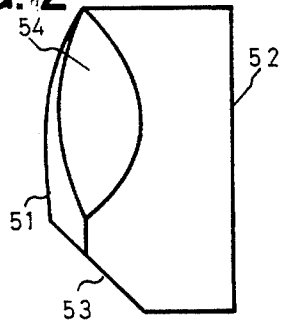
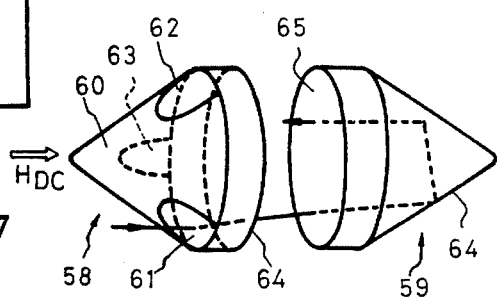
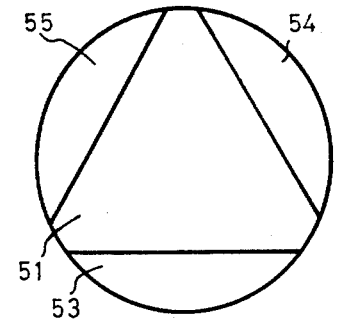
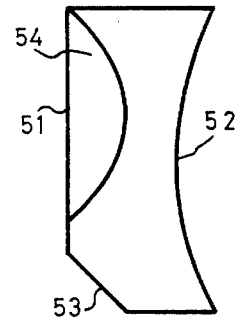
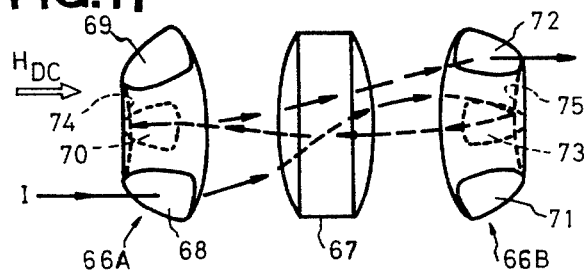
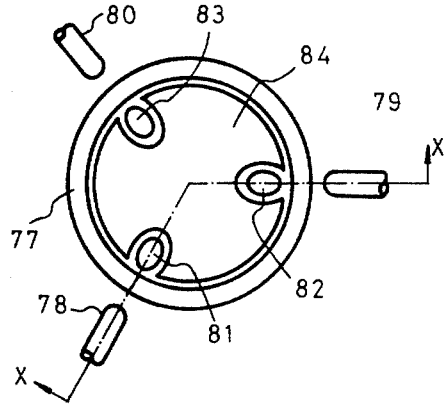
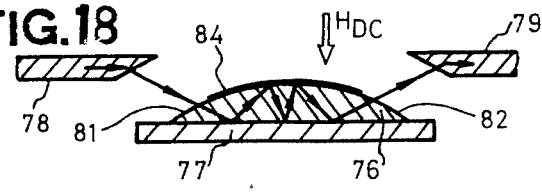

OPTICAL CIRCULATORS

BACKGROUND AND SUMMARY OF THE INVENTION

This invention relates to optical circulators that will be indispensable in optical communications.

Optical communication has been widely acknowledged as broader frequency band and bigger capacity communications with bright promise of future success, since it uses laser lights of one hundred thousand times higher frequencies than those of microwaves, and recent developements in low-loss optical glass fiber transmission lines (GFT lines) have marked an important step toward the optical communication, stimulating many researchers to prepare tentative devices for the optical communication. These devices are, however, not yet competitive with any in microwaves from the view point of technical maturity. Modulation and demodulation techniques for the optical communication are far below a satisfactory level and relevant circuit elements of various kinds are now under developement. The object of this invention is to provide a useful optical circulator for the optical communication.

An optical circulator as a nonreciprocal element acts circulation, which is explained as such that if incident signal waves are fed to three-port junction in the counterclockwise rotational turn, the signal waves emanate from the respective ports in the same rotational turn, as so does the microwave circulator. The optical circulator plays an essential role in two users' communication. For instance, if one communicates in the distance using a common transmission line for both sending and receiving their messages, it is necessary to select the desired signals carrying the partner's messages from two oppositely traveling signals at either end of transmitter or receiver. Selection of the desired signal is made using an optical circulator. Reduction of reflected signals from incomplete connections of GFT lines and other various discontinuities existing in GFT line, muliplex transmission of light signals and uses in research and development of various optical circuit elements are other instances in the circulator applications.

An optical circulator of the invention is set up using magneto-optic material (MO material). The MO material is characterized by optical anisotropy which causes magneto-optic dichronism, Faraday effect, and Kerr effect under biasing magnetic field. These phenomena are closely related with particular dispositions of the directions for the light traveling and magnetization of the MO material. In the disclosure of the invention, only the Faraday location that the light traveling direction is parallel to the magnetization vector or the direction of biasing magnetic field is appreciated. An example of MO material is aluminum or rare earth substituted YIG single crystal that may take large Faraday rotating angle and low loss factor in the ranges of more than 1.1 microns in near infrared region which covers the low-loss range of GFT lines.

It is important to say that an optical circulator can not be constructed after the analogy of microwave circulators, because of the extremely short wavelength of the laser light in contrast with the centimeter wavelengths of the microwaves and different physical properties of the MO material from those of ferromagnetic material. We can explain more explicitly about an optical circulator for the communication by use of the semiconductor laser beam at the wavelength of 1.3 micrometers. If one tries to apply the design principle of stripline or waveguide Y-junction circulator in the microwaves to the optical circulator of the present concern, it is necessary to construct its MO structure even more precisely to the degree of about one tenth of the wavelength, that is, to the 0.1 micrometer precision. Such high precision technique in machining, however, is practically difficult from the nowaday's skilled level. In addition, there are technical difficulties encountered practically. GFT lines for guiding laser beams are coupled with the MO structure, when mode conversion between GFT line modes and resonant modes of the MO structure, impedance matching between the coupled GFT lines and MO structure, and relevant circulation adjustments are the problem to be solved. In fact, a single mode GFT line has the diameter of a few microns for the core region, and a multiple mode GFT line the diameter of about fifty microns. So when these GFT lines are connected to as small a dimension of the MO structure as about one tenth microns, in handling mode conversions, impedance matching, and circulation adjustments extremely precise instruments, since the MO structure is even less than one tenth order in dimension in comparison with the single mode GFT lines. As is also known, the laser light beam has so highly concentrated power density that it may probably cause thermal heating and eventually, nonlinear effect will be induced. It is therefore inadmissible to extend the microwave circuit theory, as it is, to the optical region of interest.

The circulator embodiment of the invention bases upon newly designed configurations and performance mechanism which thoroughly differ from the prior arts of microwave circulators. One of the principal ideas in the invention is that an incident light will get sufficient Faraday rotation which is cumulated repeatedly on passages through an MO material in the direction parallel to the magnetization, as both ends of the MO structure are terminated to give rise to multiple reflections. To couple three GFT lines with the MO structure, a cubic prism is used as a signal coupler for three ports, each port having a transparent window at the Brewster angle for transmitting a signal light.

An optical circulator embodiment of the invention utilizes an MO lens system comprising MO lens elements to focus the signal light to make an image on an outlet window, and also to converge the light energy so effectively as to excite multiple resonant modes in the MO lens system and the circulator will enable the resonant modes or their coupled operating modes to perform such multiple circulation frequency operation, like diplexer operation and broadband operation, as have been achieved in microwave circulators. More detailed explanations of the invenion will be made below, referring to the drawings.

BRIEF DESCRIPTION OF THE DRAWINGS

FIGS. 7 to 14 show varieties of the embodiment of the invention shown in FIG. 6; FIGS. 7 and 8 are elevations in sections of one variety of the embodiment of the invention shown in FIG. 6 looking in the directions parallel and perpendicular, respectively, to the symmetric axis; FIGS. 9 and 10 are elevations in sections of another variety of the embodiment of FIG. 6 looking in the directions parallel and perpendicular, respectively, to the symmetric axis; FIGS. 11 and 12 are elevations in sections of another variety of the embodiment of FIG. 6 looking in the directions parallel and perpendicular, respectively, to the symmetric axis; and FIGS. 13 and 14 are elevations in sections of still another variety of the embodiment of FIG. 6 looking in the directions parallel and perpendicular, respectively, to the symmetric axis.

FIG. 15 shows a perspective view of a reflector of an embodiment of the invention that is used combining with a cubic prism disclosed in FIG. 6.

FIG. 16 is a view in perspective of an embodiment of the invention which comprises a signal coupler of a cubic prism and a reflector.

FIG. 17 is a perspective view of an embodiment of the invention which shows a transmission type of circulator, having two cubic prisms and one lens placed amid.

FIG. 18 is an elevation in section of an embodiment of the invention which is constructed on a plane mirror.

FIG. 19 is an elevation in section of the embodiment of the invention shown in FIG. 18 looking in the direction parallel to the symmetric axis.

DETAILED DESCRIPTIONS

Figure 1:
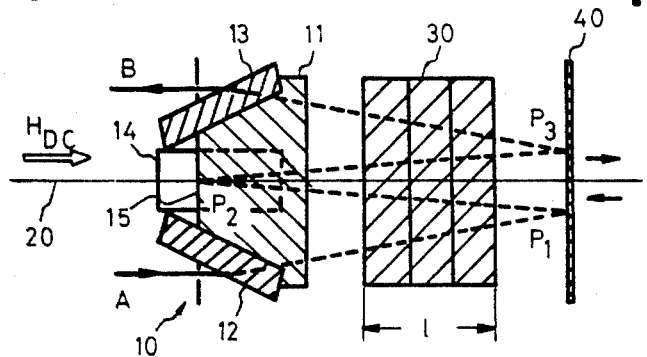
FIG. 1 is an elevation in section of an original setup of an optical circulator embodiment of the invention looking in the direction perpendicular to the symmetric axis 20 and induced magnetization of the MO material under biasing magnetic field.
Figure 2:
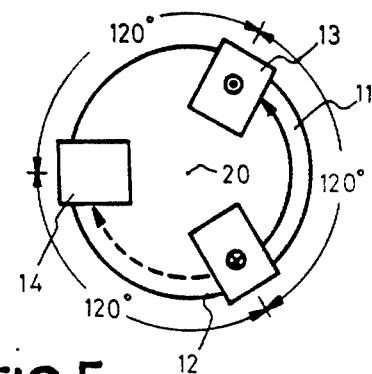
FIG. 2 is an elevation in section of the embodiment of the invention shown in FIG. 1 looking in the direction parallel to the symmetric axis 20.

Referring to the drawings shown in FIGS. 1 and 2, the basic setup of an optical embodiment of the invention and the performance mechanism will be explained successively. The optical circulator consists of a signal coupler 10, an MO structure 30, and a reflector 40, with biasing magnetic field applied parallel to the symmetric axis 20. The signal coupler 10 is made combining a dielectric 11 having triple facets, a reflecting front mirror 15, and three polarizers 12, 13, and 14 attached to three windows 12, 13 and 14. Each polarizer is placed at 120° apart from others in rotational symmetry around the symmetric axis 20 as shown in FIG. 2, so as to selectively pass the respectively polarized light beams through the three windows. To dispense with the polarizer, the dielectric 11 can be formed into a cubic prism having three faces, each face being set at the Brewster angle in reference to the optic axis which is practically chosen parallel to the symmetric axis 20. The Brewster angle $\theta$ is given by the relation $\tan \theta_0 = n = \cotan \theta$, where n is the refractive index of the dielectric used, $\theta_0$ is the angle for the light emanating from the interface of air and dielectric if the light is incident on the interface at the angle $\theta$. The angles $\theta_0$ and $\theta$ are formed between the interface and the direction of the light propagation in the air and dielectric. In the process of circulation adjustments, the optic axis for the direction of the light propagation in the dielectric is rather freely chosen in reference to the symmetric axis 20. After all, the cubic prism 11 may have three windows at different azimuthal angles with the same Brewster angles (which are called Brewster windows). The MO structure 30 is made of a single cylinder or several circular disks of YIG crystal, for an example. With the biasing magnetic field applied parallel to the symmetric axis 20, the signal light effects the Faraday rotation on passage through the MO structure of the length l, and the plane of polarization of the light is rotated counterclockwise to $\alpha l$ if the MO structure has the Faraday rotational angle $\alpha$ for unit length.

Now assume that a signal light traveling in the direction denoted by an arrow A is incident upon the polarizer 12; after it is linearly polarized, the light passes through the MO structure, effecting the Faraday rotation; the light is reflected at $P_1$ on the reflecting mirror 40 and enters into the MO structure; it again passes through the MO structure 30 in the reverse direction, also effecting the Faraday rotation; passing through the center part of the signal coupler 11, it is reflected at $P_2$ on the reflecting surface 15; and passing again through the MO structure, it reaches the window 13.

The incident light is first linearly polarized by the polarizer 12. On subsequent n-times passages through the MO structure which give the cumulative light path length nl, the light will get the Faraday rotation of $n\alpha l$. When the light is finally rotated to 120°, it can emanate the window 13, since the window has the plane of polarization at 120°, but the light can not emanate the window 14 since its plane of polarization does not agree to that of the light.

In this embodiment, three windows 12, 13, and 14 are positioned at 120° apart from each other in rotational symmetry around the symmetric axis. If the incident light is fed to the three windows in the counterclockwise rotational turn, the Faraday-rotated light emanates the respective windows in the same rotational turn. Then the counterclockwise circulation takes place.

In the above disclosure, the optical circulator is explained with regard to the counterclockwise circulation. There is, however, an opposite circulation to the aforementioned circulation, which is explained in terms of resonant rotating modes. An incident light induces both clockwise and counterclockwise rotating light waves inside the MO structure through an inlet window. As they passage the MO structure, they excite resonant modes of various orders depending on the radial, angular, and longitudinal distributions and they eventually produce operating modes of various orders, which include operating modes of clockwise and counterclockwise circulations. There is an operating mode of clockwise circulation that can satisfy the polarization requirement for the light waves which emanates from the respective outlet windows in the clockwise rotation, corresponding to the feeding of the incident light waves to the three windows. Then the clockwise circulation may take place. Alternative explanation will be made as follows. It is the case with an incident signal light having different frequencies from those of the counterclockwise circulation. If the light, incident upon the window 12, be rotated counterclockwise to 240° in the Faraday rotation on passage through the MO structure, then it looks like being rotated clockwise to 120°, so that much Faraday-rotated light will emanate the window 14. Thus the clockwise circulation may take place.

It is noted that use of such multiple passages has an advantage in that a shortened MO structure with one nth length for n-times passages compares with a MO structure with the full length for one passage. The above-described circulator embodiment is easy to make, but disadvantageous in narrow frequency band, narrow latitude of adjustment, and losses for scattering and diffraction. It may be said therefore that such an embodiment may be sufficient as far as a single frequency operation is concerned, but not for multiple frequency operation which will be explained below.

Microwave circulators which utilize plural numbers of operating modes have been disclosed in "T. Nagao, Composite resonators", U.S. Pat. No. 4,122,418, and "T. Nagao, Ferrite composite circulators", U.S. Pat. No. 4,205,281. The above-cited prior art circulators can perform such various operations as multiple circulation frequency operation, diplexer operation, broadband operation and others, in which plural numbers of operating modes play important roles. Optical circulator embodiments of the invention are considered to be able to perform such various operations on the basis of the above-disclosed performance principles of those operations, by use of plural members of resonant modes uniquely formed in the MO structure. In order to get such a circulator as to perform the various operations, it is essential to effectively excite multiple resonant modes that may produce operating modes of various orders and support circulation adjustments of various operations. To this end, in a circulator embodiment of the invention as will be shown in FIGS. 3, 4, and 5, the MO structure is constructed from a lens or a lens system to produce desirable resonant modes of light waves, by modifying their electromagnetic field distributions in the MO structure and by automatically compensating the phase requirement for perfect circulation, which is almost equivalent to the polarization requirement for the light emanating from an outlet window.

Incident light waves which will be used in the optical communication are most usually of the gaussian electromagnetic waves, so that the light beam tends to diverge on passage through the MO structure as so does it in space.

Another aim is that the incident light energy of the gaussian wave mode is much more effectively contained in the MO structure by the focusing effect of a lens or a lens system, so as to suppress scattering and diffraction losses due to multiple reflections.

A lens system for the MO structure has an advantage to be adjustable by choice in changing spacings of lenses and mirrors of various types and their parameters, for the purpose of preparing useful operating conditions for an optical circulator embodiment of the invention. Electromagnetic field distributions of desirable resonant modes have dependencies on the radial, angular, and longitudinal directions, which can be modified by changing spacings and parameters of lenses and mirrors for an adjustment purpose. The operating conditions of perfect circulation are specified by combinations of important operating modes. As already disclosed in the prior art circulator embodiment, different operations need different operating conditions which are required for adjustment of circulator parameters. In the embodiment of the invention, the adjustments can be made by combining a lens system including various types, for examples, plano-convex, plano-concave, double-convex, double-concave, and other miscellaneous mixtures, in positioning lenses and mirrors, in biasing magnetically the MO lenses, and so on.

Figure 3:
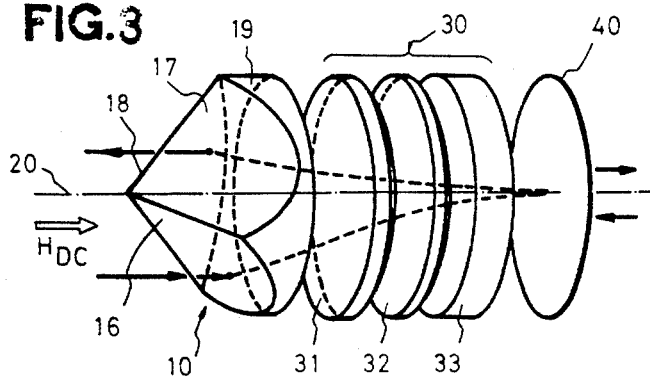
FIG. 3 is a view in perspective of another embodiment of the invention which comprises a cubic prism for a signal coupler, an MO lens system, and a reflecting mirror.
Figure 5:
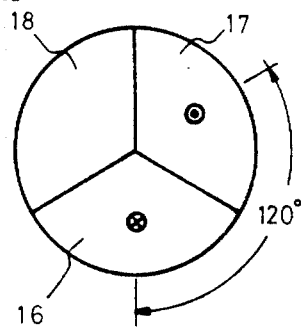
FIG. 5 is an elevation in section of FIG. 3 looking in the direction parallel to the symmetric axis.
Figure 4:
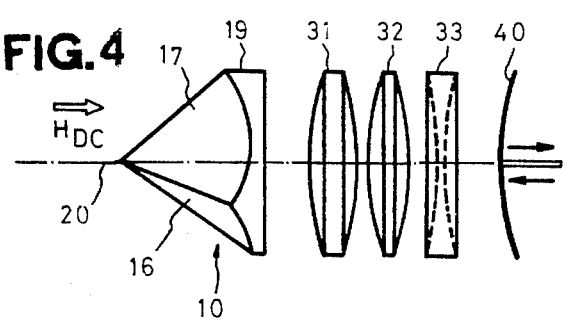
FIG. 4 is an elevation in section of FIG. 3 looking in the direction perpendicular to the symmetric axis 20.

FIGS. 3, 4, and 5 illustrate an embodiment of the invention that may satisfy the above-described requirements for better performance. In this embodiment, the signal coupler 10 is made of cubic prism equipped with three Brewster windows 16, 17, and 18, and the MO structure 30 is constituted from a pair of convergent MO lenses 31 and 32, and one divergent lens 33. The adjustable moving mirror 40 is of a convex type, which may be practically substituted by the back surface of the rear end element of the MO structure.

The performance of thus constructed circulator embodiment can be explained as follows. Assume that a signal light is incident upon the window 16 of the signal coupler 10. The light converges on passage through the MO structure 31, 32, and 33, effecting the Faraday rotation that depends on the optical path length in the MO structure, and the light is reflected by the mirror 40 to pass again the MO structure 30 in the reverse direction, further effecting the Faraday rotation. If such Faraday-rotated light, after a round trip as indicated by a broken line, throws an image on the window 17, and its plane of polarization also agrees to the polarizing angle of the window at 120°, the signal light will emanate from the window. Thus, the counterclockwise circulation takes place. Contrastively, if the light is rotated to 240° in the Faraday rotation on passage through the MO structure, throwing an image on the window 18, and also satisfying the polarization requirement for this window, then the clockwise circulation takes place. To make an image on one of the windows in either clockwise or counterclockwise rotation from an inlet window, it is necessary to adjust the resultant focal distance of the MO structure which depends on optical path lengths and geometries of constituent MO lenses, and the location of the mirror 40.

With regard to the multiple passages in this embodiment, the signal light will see different path lengths on passing along the courses changing from the center to the circumferense of the MO structure 30. The longer path length along the center course yields larger Faraday rotation, but a path length including a circumferential course gives less Faraday rotation. In the process of image forming on an outlet window, the light passing along the center course effects a large delay of the light propagation, but the light passing along the circumferential course has a little delay. This image forming process is available for compensating the dispersion characteristics for the MO structure that affect the quality of the light signals. Broadband operation for high quality communication is therefore expected. In addition, due to the focusing effect of the MO lens system 31 to 33 the image forming process, may suppress leakage losses caused by diffraction in the circumferential parts of the lenses.

Another distinct advantage in embodiment of the invention is that the incident signal light can take so various passages through the MO structure as to correspondingly excite multiple resonant modes. Excitation of the resonant modes enable the circulator embodiment of the invention to perform multiple frequency operation, diplexer operation, broadband operation, and others by use of various operating modes.

It is noted that in the above-disclosed embodiment of the invention shown in FIGS. 3 to 5, several MO lenses have been utilized, but to use only a single MO lens or to have a dielectric lens included in a lens system is still useful in getting various operations. To construct a compacter circulator embodiment of the invention, a signal coupler can be made of MO material and the reflecting mirror is united to the rear end element of a lens system. The tip of the signal coupler is no use in practice.

Figure 6:
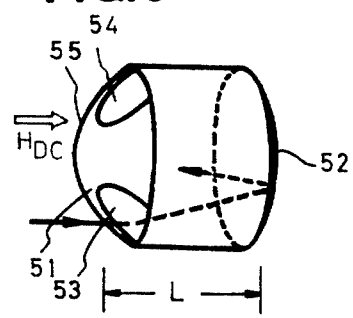
FIG. 6 is a view in perspective of another embodiment of the invention.

FIG. 6 illustrates another embodiment of the invention that is made by unification of all constituents of the above-disclosed embodiment shown in FIGS. 3 to 5. In the circulator embodiment a signal coupler, MO structure and reflecting mirror are united into one body. In short, the optical circulator embodiment is but a convergent MO structure which equippes with three Brewster windows 53, 54, and 55, and reflecting mirrors 51 and 52. Each of the windows is formed in an opening on the mirror 51 at 120° apart from others in rotational symmetry. Two convex s planes 51 and 52 of the MO structure are made into the respective concave mirrors, of which a resonator of a Fabry-Perot interferometric type (a reflection type) is composed. Such a mirror can be easily formed by electrochemical metallic plating on two convexs. After machining of each area for the Brewster windows an opening is made by adequate etching. The biasing magnetic field is applied in the direction indicated by an arrow $H_{Dc}$. The length L spans the mean path length of resonant light wave in the Fabry-Perot type resonator composed of two mirrors 51 and 52.

The performance of the circulator embodiment is explained in terms of multiple reflections by the mirrors 51 and 52, and the Faraday rotation on multiple passages through the MO structure. Assume that a signal light is incident upon the Brewster window 53. The light is repeatedly reflected by the two mirrors 51 and 52, and effects the Faraday rotation as many times passing through the MO structure. Only when the Faraday rotated light agrees with the plane of polarization at an outlet window, the signal light can emanate the outlet window. The above-described embodiment illustrated in FIG. 6 is the case for a Fabry-Perot type resonator having two concave mirrors, according to the embodiment of the invention shown in FIGS. 3 to 5. Further explanation on performance mechanisms of various operations will not be necessary if they are understood through the above disclosure. There are, however, varieties in such a Fabry-Perot type resonator by use of combinations of convex, concave, and plane mirrors, and so many variations will be introduced in optical circulator embodiments.

FIGS. 7 to 14 illustrate such variations introduced in optical circulator embodiments, where the same labeling as is used in FIG. 6 is adopted for the sake of convenience since each part denoted by the same number is to perform the same function in circulator performance.

Figure 7:
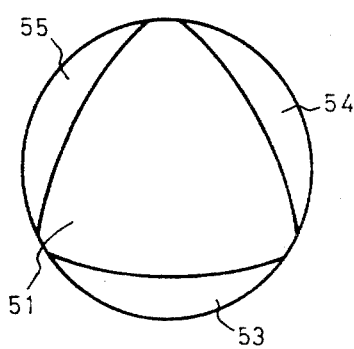
Figure 8:
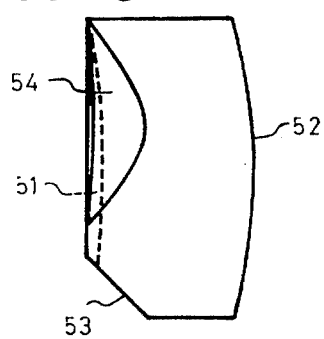

FIGS. 7 and 8 show elevations in sections of a variety in the embodiment of the invention looking in the direction parallel and perpendicular, respectively, to the symmetric axis. The front mirror 51 is concave, on which three Brewster windows 53, 54, and 55 are formed, and the rear mirror 52 is convex. The optical circulator is thus made in a Fabry-Perot type resonator.

In like wise, FIGS. 9 and 10 illustrate another variety in the embodiment of FIG. 6 that is made of a Fabry-Perot type resonator composed of the plane mirror 51, and the concave mirror 52.

FIGS. 11 and 12 illustrate another variety in the embodiment shown in FIG. 6, having the concave mirror 51 and the plane mirror 52.

FIGS. 13 and 14 illustrate another variety in the embodiment shown in FIG. 6, having the plane mirror 51 and the concave mirror 52.

These varieties shown in FIGS. 7 through 14 demonstrate various circulator embodiments of the invention developed from a simple Fabry-Perot type resonator formed from plane, convex and concave mirrors. Such a type of the resonator as has one convex mirror at least is unstable. To protect the losses of the signal light energy leaking sideward, metalic coating of the side surface is necessary. In these varieties, various Brewster windows formed on the front surfaces of the MO structures are convenient for machining of openings.

FIG. 16 illustrates another embodiment of the invention which combines the signal coupler 58 and the reflector 59. The signal coupler 58 has a conic mirror 60, three Brewster windows 61, 62, and 63 formed on the openings of the conic mirrors 60, and the rear end surface being made plane, convex or concave. The reflector 59 has the conic mirror 64 and the front transparent surface 65, the latter surface being also made plane, convex or concave. Both or either of the signal coupler 58 and the reflector 59 is made from MO material.

The performance of this embodiment is explained as follows. Assume that a signal light is incident upon the Brewster window 61 of the signal coupler 58, passing in the direction denoted by a broken line. The light is repeatedly reflected by two conic mirrors 59 and 60, and effects the Faraday rotation on passage through the signal coupler 58. If the Faraday-rotated light is polarized to 120° in the counterclockwise rotation, and it agrees the plane of polarization at the window 62, then the light emanates the window 62.

Similarly, if the incident light is applied to three windows of the signal coupler 58 in their counterclockwise rotational turn, the output light emanates from the respective windows in the same rotational turn. Thus the counterclockwise circulation is performed.

FIG. 17 illustrates another embodiment as a transmission type of an optical circulator that is arranged combining two signal couplers 66A and 66B, and one MO lens 67 placed between the two signal couplers. Two signal couplers 66A and 66B each have three Brewster windows 68, 69, and 70, and 71, 72, and 73, all three windows being located at 120° apart from others in rotational symmetry, and both couplers having, for instance, the convex mirrors 74 and 75 at their far ends.

Assume that a signal light is incident upon the Brewster window 68. The light, passing the MO lens as indicated by a broken line I, enters into the other signal coupler 66B, and is reflected by the mirror 75. After passing the MO lens 67 in the reverse direction, the light is reflected by the mirror 74, and again passes the MO lens 67. Thus the light cumulatively effects the Faraday rotation on repeated passages through the MO lens, and finally emanates from the window 72 of the signal coupler 66B if the Faraday rotated light agrees the plane of polarization of the window 72. The performance of this circulator embodiment can be further explained by the supplying of the incident light to three windows of the signal coupler 66A in their counterclockwise rotational turn, and the corresponding signal light emanating from the respective three windows of the signal coupler 66B in the same rotational turn.

On the contrary, when an incident light is supplied to the window 72 of the signal coupler 66B in the inverse course, the light is subsequently reflected at the mirrors 74 and 75, effecting the Faraday rotation on repeated passages through the MO structures. The light will emanate the window 70 of the signal coupler 66A if the Faraday rotated light agrees to the polarizing angle of the window 70. The performance of the transmission type of circulator is so far explained. The above-disclosed circulator embodiments are all applicative instances of the Faraday location. The following optical circulator embodiment of the invention is constructed in plane configuration convenient for the light passing in the transversal plane perpendicular to the symmetric axis, and so advantageous in plane circuit construction.

FIGS. 18 and 19 are elevations in sections in the optical circulator embodiment of the invention looking in the directions perpendicular and parallel, respectively, to the symmetric axis. The MO structure 76 is made in a plano-convex lens, and placed on the reflecting mirror 77. Signal light is fed to the MO structure through three GFT lines 78, 79, and 80, each line being coupled to the MO lens in its circumference at 120° apart from others in rotational symmetry. The MO lens has three windows 81, 82, and 83, each window has an opening corresponding to the spot size of the incident light beam, and the remainder surface except three openings is completely covered with a reflecting film 84. The windows 81, 82, and 83 are formed at the Brewster angle, thereby emanating the Faraday-rotated light in conformity with the plane of polarization of the outlet window. The alternative to the Brewster window is to form the end of GFT line at the Brewster angle by cutting. The biasing magnetic field is applied parallel to the symmetric axis, as denoted by an arrow $H_{DC}$.

Assume that a signal light guided in the GFT line, incident upon the window 81, penetrates into the MO structure 76. The incident light are repeatedly reflected between the mirror 77 and the mirror 84 to cumulatively effect the Faraday rotation on passage through the MO structure in the direction parallel to the symmetric axis. When the light has its plane of polarization at 120° in the counterclockwise rotation at the window 82, due to the Faraday rotation, then it emanates the window 82 to enter into the GFT line 79. In this circulator embodiment, the incident signal light may excite various resonant modes on passage through the MO structure, and those modes eventually couple with each other to produce various operating modes closely related to the plane configuration of this embodiment. Multiple frequency operation, diplexer operation, and broadband operation can be performed by using such operating modes.

Figure 20:
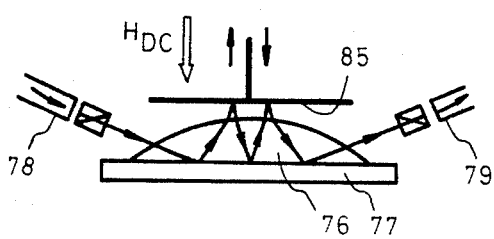
FIG. 20 is an elevation in section of another embodiment of the invention looking in the direction perpendicular to the symmetric axis.
Figure 21:
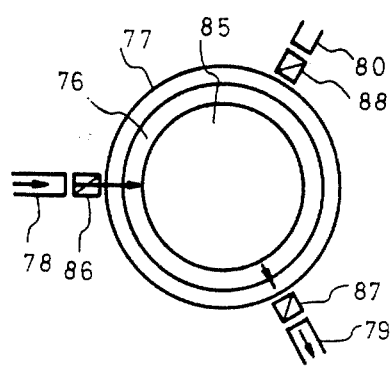
FIG. 21 is an elevation in section of the embodiment of the invention shown in FIG. 20 looking in the direction parallel to the symmetric axis.

FIGS. 20 and 21 show one variety of the above-disclosed circulator embodiment of the invention. In this embodiment, the plano-convex MO lens 76 is placed on the mirror 77, and the adjustable moving mirror 85 is set at a small space apart from the surface of the lens 76. Incident signal light, coming out of one of coupled GFT lines 78, 79, and 80, is repeatedly reflected between the mirror 77 and the mirror 85 to form desirable resonant modes in the Fabry-Perot type configuration. Small polarizing prisms 86, 87, and 88 are attached to the respective GFT lines 78, 79, and 80 to feed the linearly polarized light to the MO structure through them. The prisms are used particularly in the case of a thinner MO lens used, since the Brewster window is hard to form on the MO lens. The GFT lines 78, 79, and 80 are coupled to the MO lens via polarizing films coated on the openings. Grating is useful for the purpose of getting polarization and may be convenient for guiding incident and emanating lights in the plane configuration of the optical circulator embodiment which is not illustrated in the drawings. Discussions on necessity of a Brewster window will be made later.

Also in this embodiment shown in FIGS. 20 and 21, a convex or concave mirror may be available for the mirror 85. It is possible to modify the electromagnetic field distributions of resonant modes in the transverse plane and their playing roles in operating modes, by changing locations and geometries of the mirror 85, the lens 76 and relevant parameters. It provides useful techniques for adjusting operating frequencies in multiple frequency operations and for the purpose of changing circulation sense. The mirror 85 is also movable in the axial direction to adjust circulation conditions.

Figure 22:
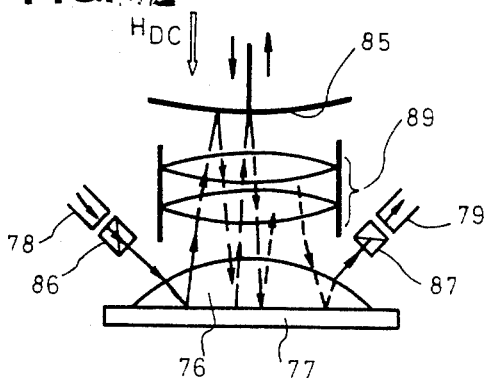
FIG. 22 is an elevation in section of still another embodiment of the invention looking in the direction perpendicular to the symmetric axis.

FIG. 22 illustrates an embodiment of the invention in which a lens system 89 is incorporated for the multiple reflecting passage in the circulator embodiment disclosed in FIGS. 20 and 21. Use of the lens system for such multiple passage enables to effectively throw an image of the incident signal light on an outlet window. Adjustment of the parameters of the lens system is important to get broadband and low loss characteristics of the circulator performance. Both of the lens system 89 and the moving mirror 85 are available for circulation adjustments. In the embodiments shown in FIGS. 18 to 22, the plano-convex MO lens is used for a signal coupler, and other complex lens systems, such as double-convex, double-concave, plano-convex, plano-concave, and other miscelaneous may be available.

In the above-disclosed embodiments of the invention, only the Faraday location is preferred. Rotation of the polarization is also caused by magnetic Kerr effect in a reflecting magnetic film evaporated on a dielectric or conductive plate. The magnetic film material is, nickel, iron and others. The magnetic film is available for a reflecting mirror to further enhance the Faraday rotation. The latter way of using the film may be practised in all the embodiments of the invention, by replacing adjustable moving mirrors with the reflecting magnetic film, or by replacing electrochemical plating films on MO structures with the magnetic film.

Application of the above-disclosed embodiments of the invention to an embodiment having more than three windows is not mentioned but possible, though the embodiment having three windows is disclosed. In the embodiments illustrated in FIGS. 1 through 17, coupling of GFT lines with a signal coupler while not explicitely mentioned can be made by directly connecting terminals of GFT lines to openings of the windows. This can diminish insertion losses in the optical circulator embodiments of the invention.

It may be remarked that in the above-disclosed embodiments of the invention various polarizing elements are necessarily incorporated. Use of the polarizing elements is a cause to the increase of insertion losses, since the signal light as the gaussian wave beam contains two rectilinearly polarized lights, either of the two lights is rejected by a polarizing element at the entrance of the circuator embodiment. It is, however, possible to dispense with such a polarizing element in the embodiment of the invention since the incident guided gaussian wave beam eventually excites resonant modes closely related to gaussian wave modes having longitudinal electric and magnetic field components in the MO structure. It is remarked again that each connecting GFT line for guiding the light beam is mostly drawn in FIGS. 18 to 22 to be set a short space apart from the MO structure or the signal coupler. This space is unnecessary in getting tight coupling between the GFT lines and the MO structure. Tightly coupled GFT lines will eliminate scattering losses of the light energy that may be caused by maladjusted connections at the openings of the windows. Significantly important is no use of the Brewster window. This is realized in the case of the tightly coupled GFT lines. Such tight coupling is made by use of a convergent lens. To this end, GFT lines are contiguously attached to the openings on the signal coupler, or the GFT lines are coupled to the signal coupler via convergent lenses. A cylindrical lens may be useful for its small size. Such use of convergent lens is a practical way for getting better coupling.

As already mentioned in the disclosure of the invention, incident gaussian light waves will excite, inside an MO structure incorporated in a Fabry-Perot type resonator, unique resonant modes, which are by nature akin to gaussian wave modes of various orders. The resonant modes involve in substance the cumulative Faraday rotation due to multiple passage and also attain the role of making an image on openings of a signal coupler, which implies that the Faraday-rotated light may certainly reach an outlet window by virtue of the resonant modes. In other words, the analogy is found in the performance instance of the $n = \pm 1$ order modes of the disk ferrite circulator in microwaves as such that the clockwise and counterclockwise rotating modes of the $n = \pm 1$ orders are adjusted to rotate at the input port a dipolar standing wave of the magnetic field in the circumference of the circulator by 30° in the clockwise or counterclockwise rotation under biasing magnetic field, and eventually act the role of circulation. Returning to the subject, discussions on the resonant modes of the present concern are continued. Their electromagnetic field components of various orders have radial, angular and longitudinal dependencies according to the incident light beam of gaussian wave modes, which are adjustable by changing locations and several parameters of the lens system used in the circulator embodiment. From the above explanations, direct contact of the GFT lines to a signal coupler is the best solution to getting rid of polarizing elements at the entrances of the windows of a signal coupler. The geometry of the openings for such tight coupling use becomes of the same size as the cross-section of a GFT line and the angle between the coupled GFT line and the plane of the opening is chosen to produce better performance characteristics, instead of the Brewster angle in reference to the symmetric axis.

As it will be understood from the above disclosure of the invention, the optical circulator embodiments of the invention will provide useful performances, such as multiple circulation frequency operation, diplexer operation, and broadband operation, in the optical communication in the near infrared region, additionally having low loss characteristics and broader availabilities in the fields of communications, measurements, research and development of various optical devices, and is so far expected to promote development of laser light applications.

What is claimed is:

1. An optical circulator comprising:
    a plurality of optical fiber transmission lines for guiding a signal light,
    a magneto-optic structure made of magneto-optic material displaying optical anisotropy under a biasing magnetic field to produce a given Faraday rotation of said signal light on passage through said magneto-optic structure,
    a signal coupler having a plurality of openings which define polarized Brewster windows formed on a common region in rotational symmetry around a symmetric axis, said transmission lines being coupled to the windows of the common region in rotational symmetry around the symmetric axis to transmit said signal light through said windows with respectively given angles of polarization,
    a first reflecting mirror formed on said common region except said openings of said signal coupler, said first mirror being positioned on said symmetric axis facing said magnetro-optic structure,
    a second reflecting mirror being positioned facing the rear surface of said magneto-optic structure, thereby said reflecting mirrors forming a reflection-type resonator,
    and means for magnetically biasing said magneto-optic structure in the direction parallel to said symmetric axis.

2. An optical circulator as defined in claim 1, wherein said magneto-optic structure is formed into a lens-like structure.

3. An optical circulator as defined in claim 1, wherein said magneto-optic structure is a lens system having a plurality of of magneto-optic lenses.

4. An optical circulator as defined in claim 1, wherein said second reflecting mirror is formed from one surface among plane, convex, and concave surfaces, said circulator further comprising an adjustable moving holder supporting said second mirror.

5. An optical circulator as defined in claim 1, wherein said signal coupler is a cubic prism having multiple Brewster windows formed on said common region of said signal coupler in said rotational symmetry around said symmetric axis.

6. An optional circulator as defined in claim 5, wherein said signal coupler has said plurality of openings defining the respective windows of said cubic prism, each opening being connected contiguously to said transmission line and a reflecting film covering the remaining surface of said common region except said openings.

7. An optical circulator comprising:
    a plurality of optical fiber transmission lines for guiding a signal light,
    a lens-like magneto-optic structure having two reflecting mirrors, one mirror being formed on the front surface and having a plurality of openings defining Brewster windows in rotational symmetry around a symmetric axis, and the other mirror being formed on the rear end surface of said lens-like structure, thereby said two mirrors forming a reflection type resonator, said transmission lines being coupled to the openings, and means for magnetically biasing said magneto-optic structure in the direction parallel to said symmetric axis.

8. An optical circulator as defined in claim 7, wherein said transmission lines are contiguously connected to said openings.

9. An optical circulator comprising:

a plurality of optical fiber transmission lines for guiding a signal light, a signal coupler, being made of a lens-like magneto-optic structure, having a plurality of openings defining Brewster windows formed on the front surface in rotational symmetry around a symmetric axis and a reflecting mirror covering said front surface except said openings, and the rear end surface being transparent, a reflector being made of a lens-like magneto-optic structure, having a transparent front surface and a reflecting rear end mirror positioned along said symmetric axis, said reflector having an adjustable moving holder supporting said reflector, thereby said mirrors of said signal coupler and said reflector forming a reflection-type resonator, and means for magnetically biasing said magneto-optic structures in the direction parallel to said symmetric axis.

10. An optical circulator as defined in claim 9, wherein said transmission lines are contiguously connected to said openings of said signal coupler.

11. An optical circulator comprising:

a plurality of optical transmission lines for guiding a signal light, a signal coupler formed in a cone-like magneto-optic structure having a front reflecting conic mirror, a transparent rear end surface, and a plurality of openings formed in said front conic mirror in rotational symmetry around a symmetric axis, a reflector formed in a cone-like magneto-optic structure having a transparent front surface and a rear end conic mirror, thereby said two mirrors of said signal coupler and said reflector forming a reflection type resonator, and means for magnetically biasing said magneto-optic structures in the direction parallel to said symmetric axis.

12. An optical circulator as defined in claim 11, wherein said transmission lines are contiguously connected to said openings of said signal coupler.

13. An optical circulator comprising:

a plurality of optical fiber transmission lines for guiding a signal light, a pair of signal couplers, each signal coupler being made of a lens-like magneto-optic structure, having a reflecting mirror formed on the front surface of the signal coupler, having a plurality of openings defining Brewster windows formed in the reflecting mirror in rotational symmetry around a symmetric axis, and having a transparent rear end surface, said pair of signal couplers being placed opposing each other with said reflecting mirrors forming a reflection type resonator, and an adjustable moving holder supporting one of said signal couplers, a lens-like magneto-optic structure being positioned between said signal couplers and having an adjustable moving holder supporting said lens-like structure, and means for magnetically biasing said magneto-optic structures in the direction paralled to said symmetric axis.

14. An optical circulator comprising:

a plurality of optical transmission lines for guiding a signal light, a reflecting plate, a convex lens-like magneto-optic structure placed on said reflecting plate, having a plurality of openings formed on the convex surface of said magneto-optic structure in rotational symmetry, said transmission lines being coupled to said openings, a concave mirror formed on said convex surface of said magneto-optic structure, thereby said reflecting plate and said concave mirror forming a reflection type resonator, and means for magnetically biasing said magneto-optic structure in the direction parallel to said symmetric axis.

15. An optical circulator as defined in claim 14, wherein said transmission lines are contiguously connected to said openings of said magneto-optic structure.

16. An optical circulator as defined in claim 14, wherein said concave mirror has a central opening which is transparent, and an adjustable moving mirror is positioned a short space apart from said central opening to reflect said signal light repeatedly against said reflecting plate in passing through said central opening of said concave mirror.

17. An optical circulator as defined in claim 14, wherein said transmission lines are contiguously connected to said openings, said concave mirror has a central opening, and an adjustable moving mirror is positioned a short space apart from said central opening to reflect said signal light repeatedly against said reflecting plate in passing through said central opening of said concave mirror.

18. An optical circulator as defined in claim 14, wherein said concave mirror has a central opening, a lens system is positioned a short space apart from said central opening, and an adjustable moving mirror is set apart from said lens system.

19. An optical circulator as defined in claim 14, wherein said transmission lines are contiguously connected to said openings, said concave mirror has a central opening, a lens system is positioned a short space apart from said central opening, and an adjustable moving mirror is set apart from said lens system.

20. An optical circulator for coupling to a plurality of optical fiber transmission lines for guiding a light signal, said circulator comprising:

a magneto-optic structure comprising magneto-optic material which exhibits optical anisotropy under a biasing magnetic field to produce a predetermined Faraday rotation of the plane of polarization of a light signal upon passage through the magneto-optic structure;

a signal coupler having a plurality of polarized openings for transmitting light signals at predetermined angles of of polarization, each of said coupler openings being set at the Brewster angle to incident light signals and placed in rotational symmetry with respect to other coupler openings around a common axis;

a first reflecting mirror positioned at one end of the magneto-optic structure to reflect light signals passing through the magneto-optic structure and a second reflecting mirror being positioned at an opposing end of the magnetic-optic structure and facing the first mirror to thereby form a reflecting type resonator with the magneto-optic structure between the mirrors; and means for magnetically biasing said magneto-optic structure in the direction parallel to the common axis, wherein a light signal entering the circulator through a signal coupler opening is polarized and the plane of polarization is rotated by multiple passages of the light signal through the magneto-optic structure reflecting between the mirrors with the light signal exiting through a polarized opening having the same angle of polarization as the rotated light signal.

21. An optical circulator for coupling to a plurality of optical fiber transmission lines for guiding a light signal, said circulator comprising:
   a magneto-optic structure comprising magneto-optic material which exhibits optical anisotropy under a biasing magnetic field to produce a predetermined Faraday rotation of the plane of polarization of a light signal upon passage through the magneto-optic structure,
   said structure having a front mirror to internally reflect light signals within the structure, said structure having a plurality of polarized openings for transmitting light at predetermined angles of polarization, said openings being placed in rotational symmetry with respect to a common axis centered with respect to the front mirror,
   said structure also having a rear mirror on the common axis facing the front mirror and openings, for reflecting polarized light signals back to the front mirror and openings, wherein a light signal entering the circulator through an opening is polarized and the plane of polarization is rotated by multiple passages of the light signals through the structure reflecting between the mirrors with the polarized light signal exiting the circulator through a polarized opening having the same angle of polarization as the rotated light signal.

22. An optical circulator for coupling to a plurality of optical fiber transmission lines for guiding a light signal, said circulator comprising:
   a signal coupler having a plurality of polarized openings for transmitting light signals at predetermined angles of polarization, each of the coupler openings being placed in rotational symmetry with respect to a common axis;
   a lens system placed along the common axis comprising magneto-optic material which exhibits optical anisotropy under a biasing magnetic field to produce a predetermined Faraday rotation of the plane of polarization of a light signal upon passage through the lens systems; and
   a reflector aligned along the common axis for reflecting light signals having passed through the lens system back through the lens system to the signal coupler and having means for adjusting the position of the reflector relative to the lens system and signal coupler wherein a light signal entering the circulator through a signal coupler opening is polarized and the plane of polarization is rotated by multiple passages of the light signal through the lens system with the light signal exiting through a polarized opening having the same angle of polarization as the rotated light signal.

23. An optical circulator for coupling to a plurality of optical fiber transmission lines for guiding a light signal, said circulator comprising:
   a magneto-optic structure comprising magneto-optic material which exhibits optical anisotropy under a biasing magnetic field to produce a predetermined Faraday rotation of the plane of polarization of a light signal upon passage through the magneto-optic structure, said structure having a cone-shaped front portion having an internal mirrored surface and a plurality of polarized openings for transmitting light signals at predetermined angles of polarization, said openings being placed in rotational symmetry with respect to a common axis centered with respect to the structure; and
   a second magneto-optic structure having a cone-shaped rear portion co-axially aligned with the first structure, said rear portion having an internal mirrored surface to reflect light signals from the first structure back to the first structure wherein a light signal entering the circulator through a polarized opening is polarized and the plane of polarization is rotated by multiple passages through the structures reflecting between the mirrored surfaces with the light signal exiting through a polarized opening having the same angle of polarization as the rotated light signal.

24. An optical circulator for coupling to a plurality of optical fiber transmission lines for guiding a light signal, said circulator comprising:
   a first signal coupler having a plurality of polarized openings for transmitting light signals at predetermined angles of polarizations, each of the coupler openings being placed in rotational symmetry with respect to a common axis;
   a lens placed along the common axis, said lens comprising magneto-optic material which exhibits optical anisotropy under a biasing magnetic field to produce a predetermined Faraday rotation of the plane of polarization of a light signal upon passage through the lens; and
   a second signal coupler having a plurality of polarized openings for transmitting light signals at predetermined angles of polarizations, each of the coupler openings being placed in rotational symmetry with respect to the common axis;
   wherein a light signal entering the circulator through an opening of the first signal coupler is polarized and the plane of polarization is rotated by the light signal passing through the magneto-optic material with the light signal exiting through a polarized opening of the second signal coupler having the same angle of polarization as the rotated light signal.

25. An optical circulator for coupling to a plurality of optical fiber transmission lines for guiding a light signal, said circulator comprising:
   a plate reflector;
   a plano-convex lens-shaped magneto-optic structure placed on said plate reflector and comprising magneto-optic material which exhibits optical anisotropy under a biasing magnetic field to produce a predetermined Faraday rotation of the plane of polarization of a light signal upon passage through the magnetic-optic structure, said structure having a plurality of polarized openings for transmitting light signals at predetermined angles of polarization, said openings being placed in rotational symmetry with respect to a common axis centered with respect to the structure;
   said structure also having a second reflector on the common axis facing the structure and the plate reflector for reflecting polarized light signals back to the plate reflector through the structure wherein a a light signal entering the circulator through an opening is polarized and the plane of polarization is rotated by multiple passages of the light signal through the structure reflecting between the reflectors with the polarized light signal exiting the circulator through a polarized opening having the same angle of polarization as the rotated light signal.

26. The circulator of claim 25 wherein the second reflector comprises a coating of reflection material on the convex surface of the structure to thereby form a concave reflector facing the plate reflector.

27. The circulator of claim 25 further comprising a lens system positioned between the second reflector and the magneto-optic structure.

* * * * *